(12) United States Patent
Philippot et al.

(10) Patent No.: US 7,222,915 B2
(45) Date of Patent: May 29, 2007

(54) BACKREST OF AN AUTOMOBILE VEHICLE SEAT

(75) Inventors: Jérôme Philippot, Saclas (FR); Philippe Delias, Etrechy (FR)

(73) Assignee: Faurecia Sieges D'Automobile S.A., Nanterre (FR)

( * ) Notice: Subject to any disclaimer, the term of this patent is extended or adjusted under 35 U.S.C. 154(b) by 0 days.

(21) Appl. No.: 10/783,967

(22) Filed: Feb. 20, 2004

(65) Prior Publication Data

US 2004/0183356 A1 Sep. 23, 2004

(30) Foreign Application Priority Data

Feb. 21, 2003 (FR) .................................. 03 02195

(51) Int. Cl.
*B60N 2/42* (2006.01)

(52) U.S. Cl. ....................... 297/216.13; 297/216.14; 297/452.18; 297/452.59

(58) Field of Classification Search ........... 297/452.18, 297/452.2, 452.29, 452.55, 452.56–452.59, 297/440.2, 463.1–463.2, 487, 488, 216.1, 297/216.13, 216.14, 452.31–452.33
See application file for complete search history.

(56) References Cited

U.S. PATENT DOCUMENTS

| | | | | |
|---|---|---|---|---|
| 3,669,498 A | * | 6/1972 | Meyers et al. | 297/452.53 |
| 3,861,747 A | * | 1/1975 | Diamond | 297/452.49 |
| 4,036,527 A | * | 7/1977 | Faul | 297/452.39 |
| 4,318,556 A | * | 3/1982 | Rowland | 297/448.2 |
| 4,746,168 A | * | 5/1988 | Bracesco | 297/440.2 |
| 4,875,736 A | * | 10/1989 | Brambilla | 297/440.1 |
| 5,338,098 A | * | 8/1994 | Ohnishi | 297/452.6 |
| 5,441,331 A | * | 8/1995 | Vento | 297/452.33 |
| 5,522,645 A | * | 6/1996 | Dahlbacka | 297/452.55 |
| 5,568,959 A | * | 10/1996 | Weber et al. | 297/238 |
| 5,609,395 A | * | 3/1997 | Burch | 297/452.55 |
| 5,647,637 A | * | 7/1997 | Jay et al. | 297/354.12 |
| 5,845,966 A | * | 12/1998 | Severinski et al. | 297/216.13 |
| 6,027,171 A | | 2/2000 | Partington et al. | |
| 6,062,649 A | * | 5/2000 | Nagel et al. | 297/452.38 |
| 6,199,252 B1 | * | 3/2001 | Masters et al. | 29/91.1 |
| 6,994,401 B1 | * | 2/2006 | Fischer et al. | 297/452.14 |

FOREIGN PATENT DOCUMENTS

DE 197 57 060 6/1999

OTHER PUBLICATIONS

French Preliminary Search Report dated Oct. 21, 2003 for French Application No. 03-02195.

* cited by examiner

*Primary Examiner*—Anthony D. Barfield
*Assistant Examiner*—Erika Garrett
(74) *Attorney, Agent, or Firm*—Stephen Bongini; Fleit Kain Gibbons Gutman Bongini & Bianco P.L.

(57) ABSTRACT

The backrest (2) of an automobile vehicle seat includes a framework (21), a padding (3), a padding cover (4) covering the front face and the sides of the backrest and a padding screen (7) for the rear face of the backrest. It includes a rigid back panel shield frame (6) with at least two lateral sides (62) and a bottom side (63), the said shield frame being adapted to be attached to the framework (21) of the backrest to cover the lateral edges of the framework and a bottom part of the rear of the backrest, the shield frame (6) including towards an inner edge at least one groove (64) adapted to accommodate and hold an edge (44) of the cover and an edge (71) of the screen, the said cover covering the shield frame.

20 Claims, 8 Drawing Sheets

Fig. 2a
section A-A

Fig. 2b
section B-B

BACKREST OF AN AUTOMOBILE VEHICLE SEAT

FIELD OF THE INVENTION

This invention concerns a backrest of a seat especially for automobile vehicles.

More precisely, it concerns the padding and the finishing of the rear of the backrest, especially for so-called thin-type or reduced volume seat backrests. The aim of this type of seat, in the first row, or possibly any other row, is especially to allow the padding to be placed as near as possible to the technical zones, that is zones including functional structural elements such as framework elements or a suspension mat for example or mechanisms or equipment such as hinge mechanisms, inflatable protective cushions, etc. Apart from creating special style effects, the aim is thus to optimise passenger comfort in the seats located behind the concerned seats by pushing the rear face of the backrest as far as possible forwards whilst complying with the shapes and comfort elements required for the front face of the backrest. The invention could however apply also to any other type of seat.

BACKGROUND OF THE INVENTION

Various techniques are already known to achieve the padding of the rear face of the backseat.

According to a first embodiment, the padding consists of a flexible textile screen which can be an integral part of the cover and which is thus simultaneously put in place with the padding of the front face of the backrest. The padding is done by fitting the cover assembly over the backrest and maintaining the cover by pull rods and clips attaching them to the framework or to the suspension mat which acts as support for the backrest padding. The textile screen can also be added to the rear face, independent of the cover which then covers only the front face and the sides. The screen is for example clipped to simple attachment sections attached to the framework of the backrest and onto which the edges of the cover can also be clipped. With this first embodiment with a flexible textile screen, it is difficult to ensure good attachment quality especially in the finishing zones at the bottom of the backrest and, in addition, installation requires many attachment parts such as fasteners, tie-downs, etc.

According to another embodiment, the padding of the rear face of the backrest consists of a textile screen stiffened by a flat rigid insert which is clipped onto the framework, the edges of this screen covering the edges of the cover installed previously.

According to a third embodiment, the rear face of the backrest entirely consists of a plastic shell the lateral edges of which can extend beyond the sides of the backrest so as to cover the edges of the cover and their means of attachment to the framework, the said cover being installed previously. The rear face can also consist of a stiff plastic shell attached first to the framework, the cover then being installed and held by clipping the edges of the cover over the periphery of the said shell. The appearance and the stiffness of these shells do not allow market requirements to be met.

Generally, these various techniques all have disadvantages for obtaining thin backrests, especially the impossibility to simply obtain screens or rear faces the shape of which is optimised to obtain a minimum volume of the backrest and a maximum gain in space for the knees of the passengers located behind the seats concerned.

SUMMARY OF THE INVENTION

The aim of this invention is to solve these problems.

With these targets in mind, the object of the invention is a backrest of an automobile vehicle seat including a framework, a padding, a padding cover covering the front face and the sides of the backrest and a backrest rear face padding screen, characterized in that it includes a rigid back panel shield frame with at least two lateral sides and one bottom side, the said shield frame being adapted to be fixed onto the framework of the backrest to cover the lateral edges of the framework and a bottom part of the rear of the backrest, the shield frame including towards an inner edge at least one groove adapted to accommodate and retain together an edge of the cover and an edge of the screen, the said cover covering the shield frame.

Each free edge of the screen, that is those which are not attached directly to the cover by sewing for example, is therefore attached to the side or the sides of the shield frame which include(s) an attachment groove. On this or these sides of the shield frame, the cover includes one or more flaps which extend its part in contact with the padding beyond the edge of the said padding and which cover the edge of the shield frame while mating with its shape.

As it will be understood better later, the shield frame, added to the framework and covered by the cover or by the cover edge flaps, determines the shapes of the contour of the rear of the backrest and especially junction zones between, on the one hand, the rear of the backrest and, on the other hand, the lateral edges and the bottom edge of the backrest. The rigid shield frame also covers the framework of the backrest and therefore allows the elimination of the volumes of padding foam conventionally required to define the shapes and the style of the seat and avoids direct contact of the cover, and of the passengers, with the framework elements. The shield frame according to the invention thus solves all problems related to compliance with the minimum radii of the safety regulations. Also, it allows symmetrical shapes to be easily obtained for the two sides of the backrest even if the framework does not have such a symmetry, and passing as close as possible to the said framework.

Moreover, the use of such a shield frame allows, by the choice of the position and the shape of the screen retention groove or grooves, to provide it with the most suitable shape from the point of view of the style required for the seat thus providing a great freedom in the design. It also allows accurate positioning of the screen to be ensured in relation to the framework and to the suspension mat so that the screen will be located as near as possible to the said mat taking into account the possible deflection of the mat to finally obtain a backrest as thin as possible at least in the centre zone, thus providing more space for the knees of the rear passengers and therefore increased passenger comfort.

Shield frames with the same external shapes and therefore allowing identical shapes to be offered for the finished seat can thus be used for different frameworks in the case, for example, of backrests with different functionalities requiring a modification of the frameworks. The use of such a shield frame also allows a better finish to be obtained for the padding especially in the zone at the bottom of the backrest.

Another advantage of the invention is that, due to the fact that the shield frame is concealed, as covered by the cover when the backrest padding is completed, the said shield frame can be made of all recycled plastic materials or any other material such as for example glass fibre reinforced resin or compacted wood, etc., its appearance having no importance for the aesthetic appearance of the finished seat unlike prior art where a plastic shell is used and remains visible on the finished seat.

From the manufacturing process and seat assembly point of view, the use of the shield frame allows the padding to be simplified concerning the installation both of the rear screen and of the cover covering the front and the sides of the backrest. The cover and the screen are attached directly to the shield frame with full accessibility to the attachment means from the exterior. There are therefore no longer any attachment or hooking operations required on the framework and/or the suspension mat, obliging the operator to make, as in prior art, hooking operations from the bottom of the cover or the screen at the same time as the adjustment of these items on the backrest. Also, the number of attaching parts can be significantly reduced.

According to a preferential arrangement, the shield frame is a closed frame and includes four sides, the groove running continually around the four sides, the screen is attached around its complete periphery in the said groove and an edge of the cover is also fixed around its contour in the said groove so as to retain the cover and the padding and also so that the flaps of the cover are correctly applied and taut on the outer edges of the sides of the shield frame.

More generally, in the case where the screen is attached to the cover especially at the top of the rear of the backrest, the shield frame can include only three sides: two lateral sides, required to ensure the shape of the lateral edges of the rear of the backrest and a bottom side, also required to ensure the required shape at the bottom of the backrest but also to allow the attachment of the lower edge of the screen and of a lower flap extending the front face of the cover and passing under the lower edge of the backrest. In this case, at the top of the backrest, the padding covers the framework and gives the required shape to the top of the backrest and, in particular, it is integrated with the cover into an embodiment of known type called in-situ manufacture, or by bonding, where the cover and padding are permanently attached.

According to specific complementary or optional arrangements, the means for attaching the edges of the screen and/or the cover include elastic clips insertable into corresponding holes made in the bottom of the groove, the said clips are made from a profiled strip with an arrow-shaped section sewn onto the edge of the cover and/or screen, the suspension mat is attached to the shield frame, the shield frame includes on a lateral side a counterform for an inflatable protective cushion.

Other features and advantages will appear in the description which will be given of an automobile seat including a backrest in compliance with the invention.

BRIEF DESCRIPTION OF THE DRAWINGS

Refer to the appended drawings on which:

FIG. 3 shows the installation of the screen on the shield frame, then of the shield frame thus equipped on the framework of the backrest, FIG. 3a being a detailed view showing the attachment by sewing of the attachment strip on the edge of the screen.

DETAILED DESCRIPTION OF PREFERRED EMBODIMENTS

Figure 1:
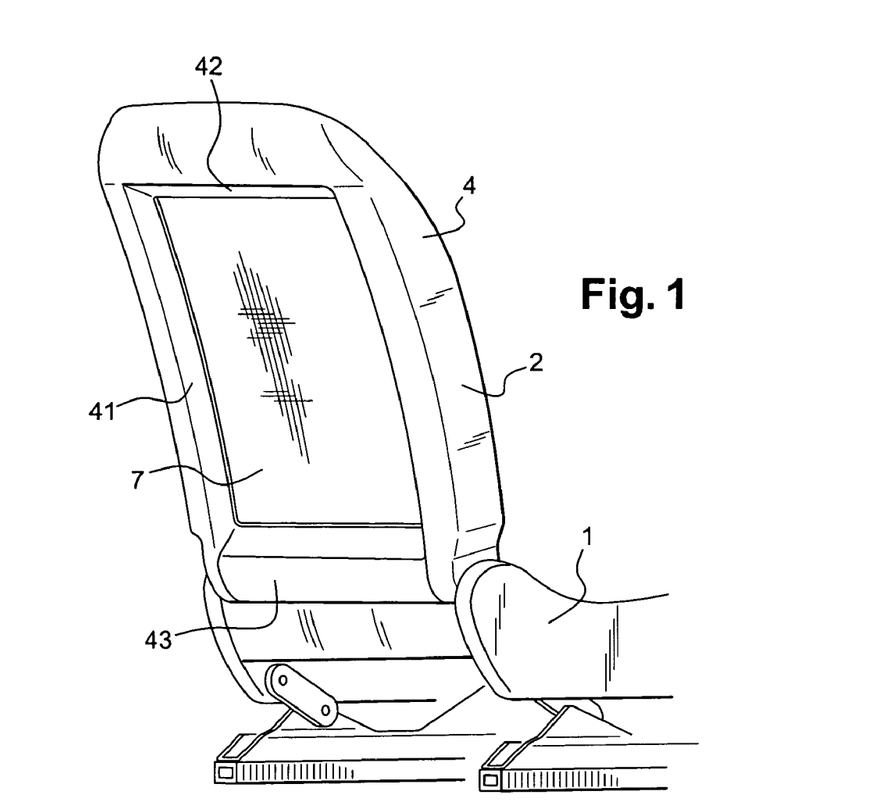
FIG. 1 is an overall rear perspective view of the seat.

The seat shown on FIG. 1 includes a seat pan 1 and a backrest 2, in compliance with the invention, hinged on the seat pan.

Figures 3, 3A:
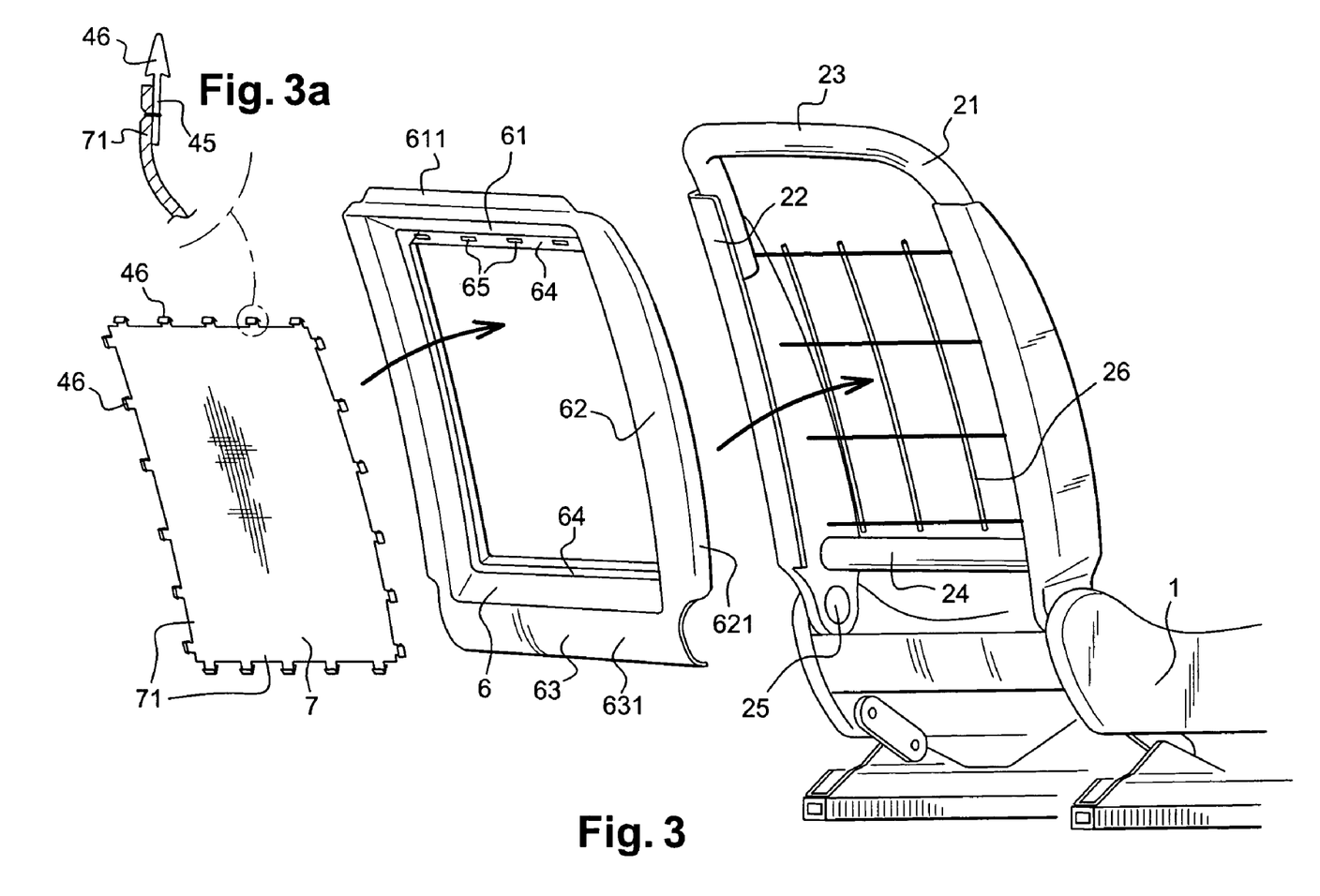
Figure 6:
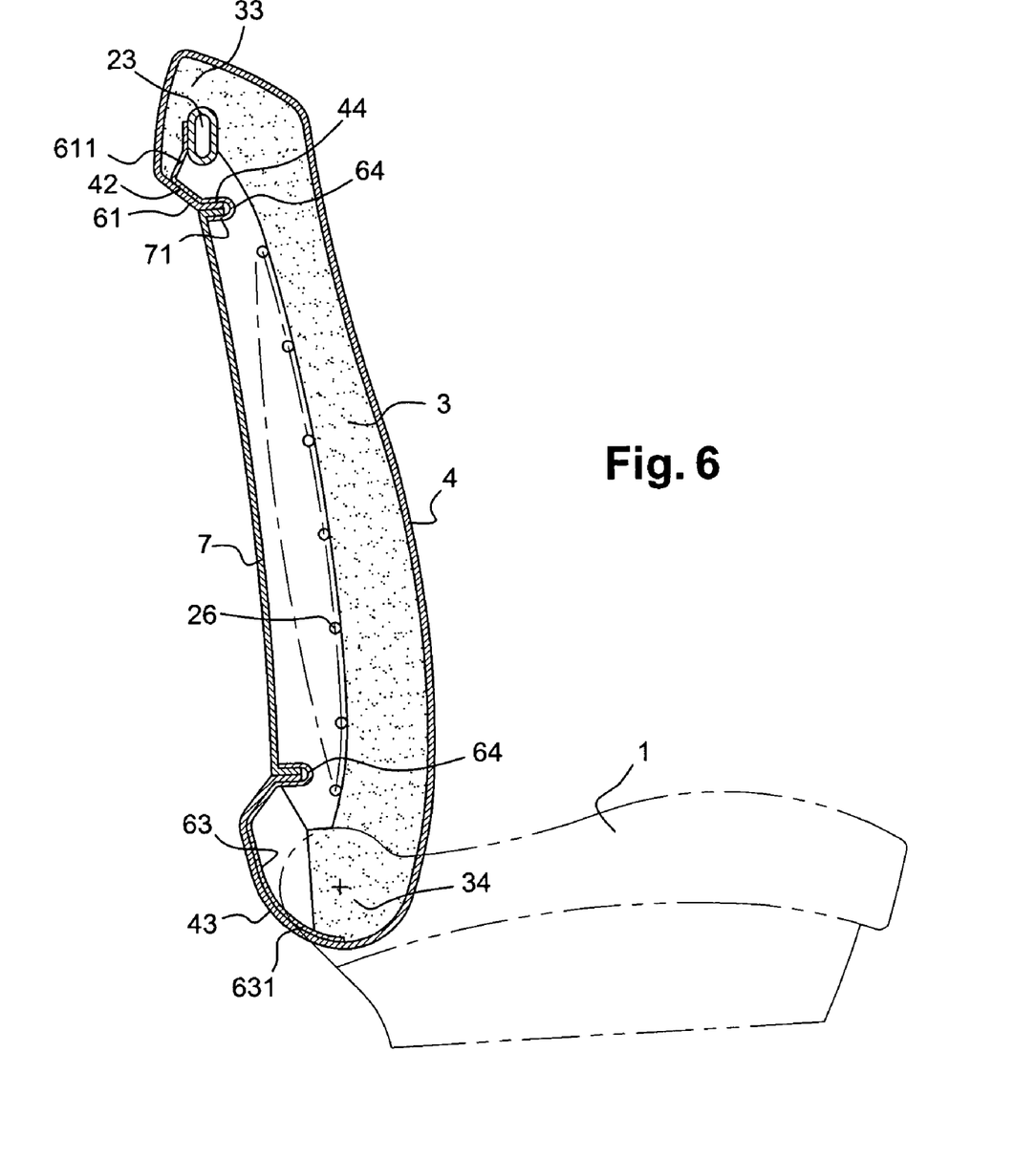
FIG. 6 is a cross-sectional view of the finished backrest through a vertical plane along the line A—A on FIG. 2.

The backrest includes, as it can especially be seen on FIGS. 3 and 6, a metallic framework 21, consisting, for example, of a bent tube forming an upper crossmember 23, two lateral uprights 22 and a lower crossmember 24. The lower ends of the lateral uprights, which extend downwards beyond the lower crossmember, accommodate the backrest-to-seat pan hinge mechanisms 25.

A suspension mat 26 is attached to the framework 21, in a manner known per-se. The mat 26 supports a padding 3 covered by padding cover 4.

Figure 7:
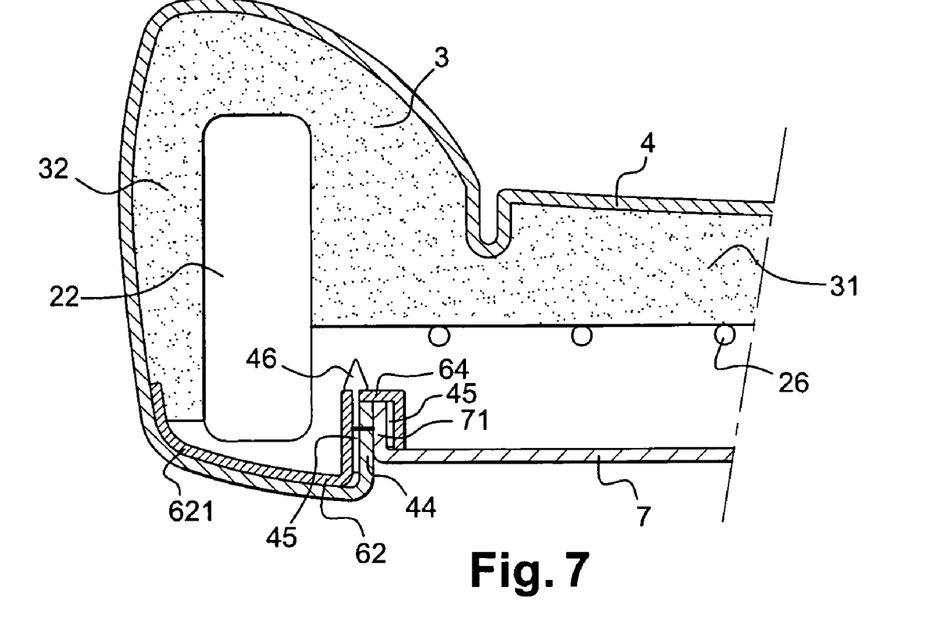
FIG. 7 is a cross-sectional view of the edge of the backrest through line C—C of FIG. 2.

In the example shown, the cover and padding assembly forms one piece obtained either by a known in-situ type process, where the padding is a synthetic foam cured in a mould directly in contact with the cover, or by bonding of the cover to the previously formed padding according to typical processes also known. As it can be seen on FIG. 5, the padding 3 includes a wall 31 intended to bear against the mat 26, lateral padding sections 32 to cover each of the uprights of the framework towards the front and on the sides as it can be clearly seen on the cross sections of FIGS. 7 and 8, an upper padding 33 to cover the upper crossmember 23 and a lower padding section to especially cover the lower crossmember 24 and the mechanisms 25, these padding sections being clearly visible on FIG. 6. The various parts of the padding thus define between them a cavity of shape and dimensions suitable to house the framework of the backrest.

In compliance with the invention, a shield frame 6 is attached to the framework of the backrest, by any suitable attachment means, such as, for example, by screwing, clipping, pinning locating or any combination of these methods, of a known type.

Figure 2:
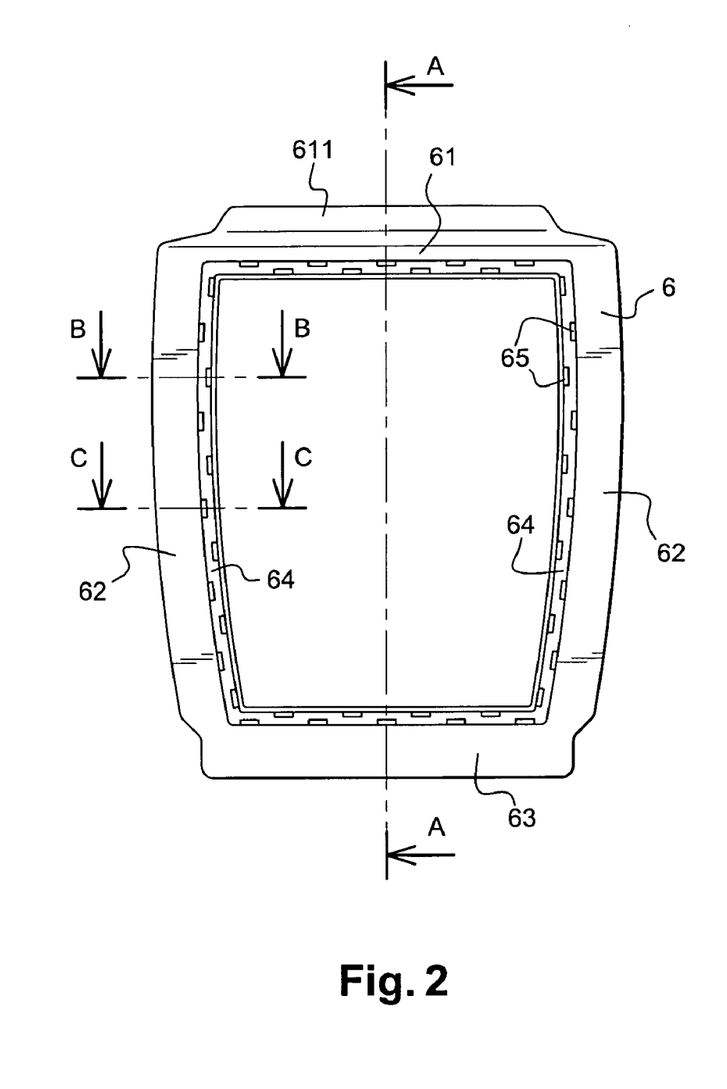
FIG. 2 is a plan view of the back panel shield frame, views 2a and 2b being cross sections of the said shield frame, respectively of its top side and of one of its lateral sides.
Figure 2A:
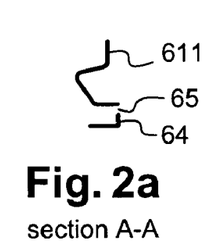
Figure 2B:
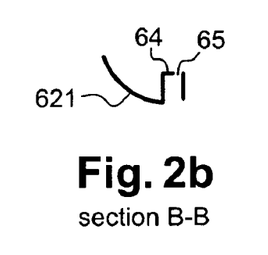

The shield frame according to the invention is made of a plastic material and has a general rectangular shape as shown on FIG. 2 only as a non-restrictive example. The shield frame includes a top side 61, the section of which, as shown on FIG. 2a, includes, for example, a tab 611 extending upwards and designed to bear on the upper crossmember 23 and on which the upper padding section 33 bears as it can be seen on FIG. 6. The lateral sides 62 of the shield frame have a shape provided to give the lateral edges of the rear face of the backrest the required curvature and their sections, as shown on FIG. 2b, include towards the outer edge of the shield frame a rounded section 621 covering the framework uprights 22 and extending over the sides of the backrest to ensure the continuation of the shape with the side padding sections 32 of the padding. In a similar manner, the bottom side 63 of the shield frame includes a rounded section 631 which covers the complete lower part of the framework of the backrest the edge of which continues the shape of the lower padding section 34 of the padding.

A U-shaped groove 64 open towards the rear of the seat is made on the inner edge of each side of the shield frame.

The cover 4 covers all the external surfaces of the padding and includes lateral flaps 41, an upper flap 42 and a lower flap 43, which extend beyond the edges of the padding so as to cover the outer edges of the sides of the shield frame 6. The edge 44 of the flaps is inserted into the groove 64 and is held in the bottom of the groove by anchoring means such as clips or similar devices. Preferably, as shown on FIGS. 7 and 8, plastic strips 45 of an arrow-shaped section will be used for this in which a set of cut-outs are machined to form crenelations 46 comprising attachment clips. The strips 45 are sewn to the edges 44 of the flaps. On installation, the said crenelations 46 are inserted into the holes 65 of suitable section made in the bottom of the groove 64, shown on FIG. 2, where they remain in place thanks to the arrow shape which prevents their retraction as it can be seen on the cross-section of FIG. 7.

Figure 8:
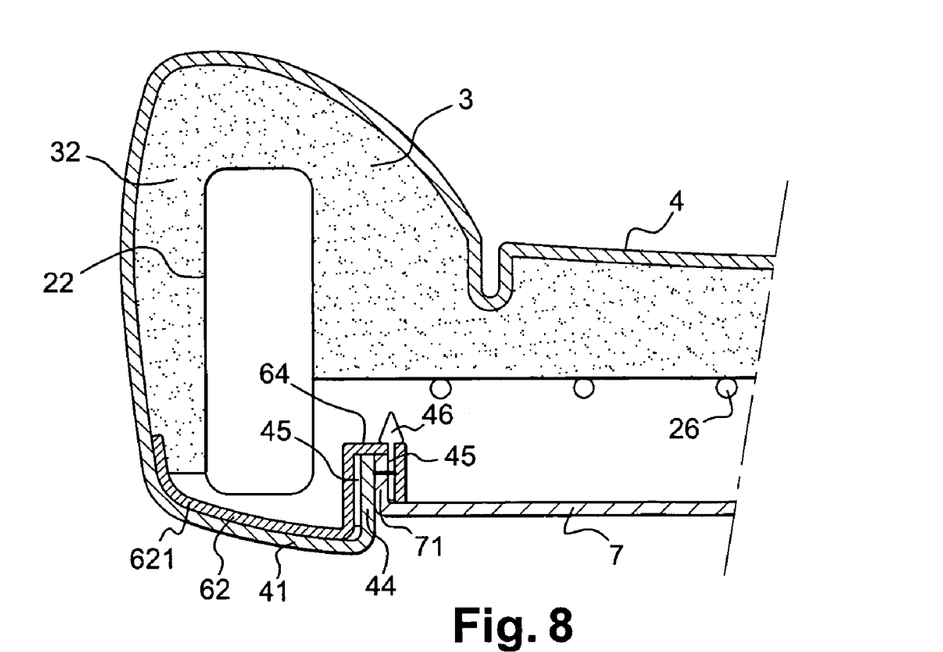
FIG. 8 is a cross-sectional view of the edge of the backrest through line B—B of FIG. 2.

A screen 7 ensuring padding of the centre part of the rear face of the backrest is attached to the shield frame 6 in a similar way as it can be seen especially on FIG. 8 by insertion into the said groove 64 of the edges 71 of the screen onto which are also sewn strips 45 of anchoring crenelations 46 as shown on the detail of FIG. 3*a*. The screen 7 can be a simple flexible textile film tensioned on shield frame 6 or it can also be stiffened.

Figure 4:
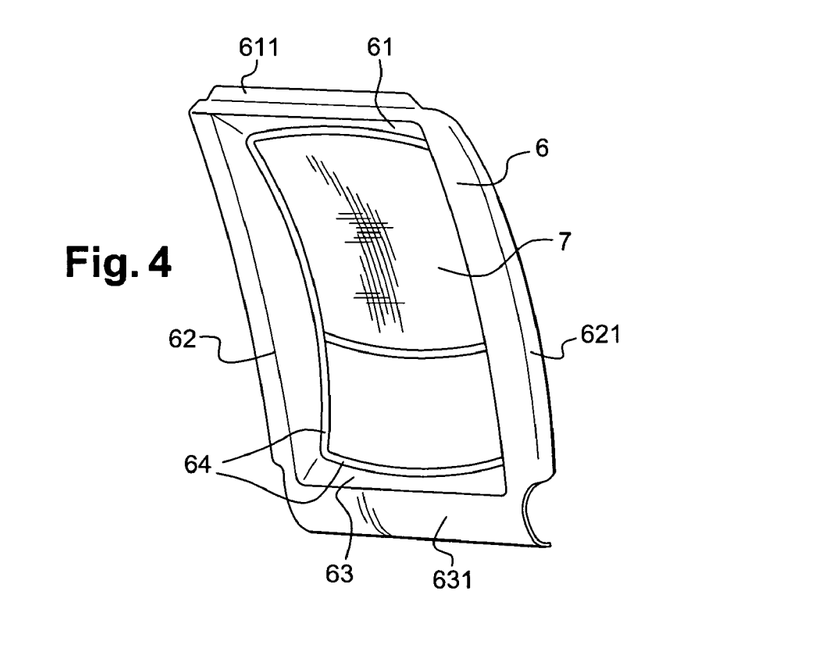
FIG. 4 shows the shield frame equipped with the screen, in a variant of the shape of the said shield frame.

It will be noted, especially on the view of FIG. 4, that the shield frame according to the invention can be moulded giving curved shapes to its lower edge to finally provide the screen with a hollow surface or many other shapes thus allowing style effects to be obtained which would be impossible to obtain simply without such a shield frame.

Also, it can be seen that the edges 44, 71 respectively of the cover 4 and of the screen 7 are inserted into the same groove 64 and the anchoring crenelations 46 are inserted into the holes 65 of two respective rows of holes so that the edges 44, 71 of these elements are pressed one against each other in the groove between the flanges of the U comprising it, ensuring a clean joint completely concealing the shield frame 6 and all the anchoring elements. Means other than the crenelations described above could of course be used to ensure the anchoring of the edges of the cover and of the screen in the groove of the shield frame.

A description will now be given of a typical, but not exclusive, embodiment of padding of the backrest.

First, as shown on FIG. 3, the screen 7 is attached to the shield frame 6, by inserting its edge 71 into the groove 64 and is held by the crenelations 46 inserted into the holes 65 in the bottom of the groove. Then the shield frame thus equipped is positioned on the rear of the framework of the backrest and attached to the framework by screwing or by clipping, for example, as shown on FIG. 5.

Figure 5:
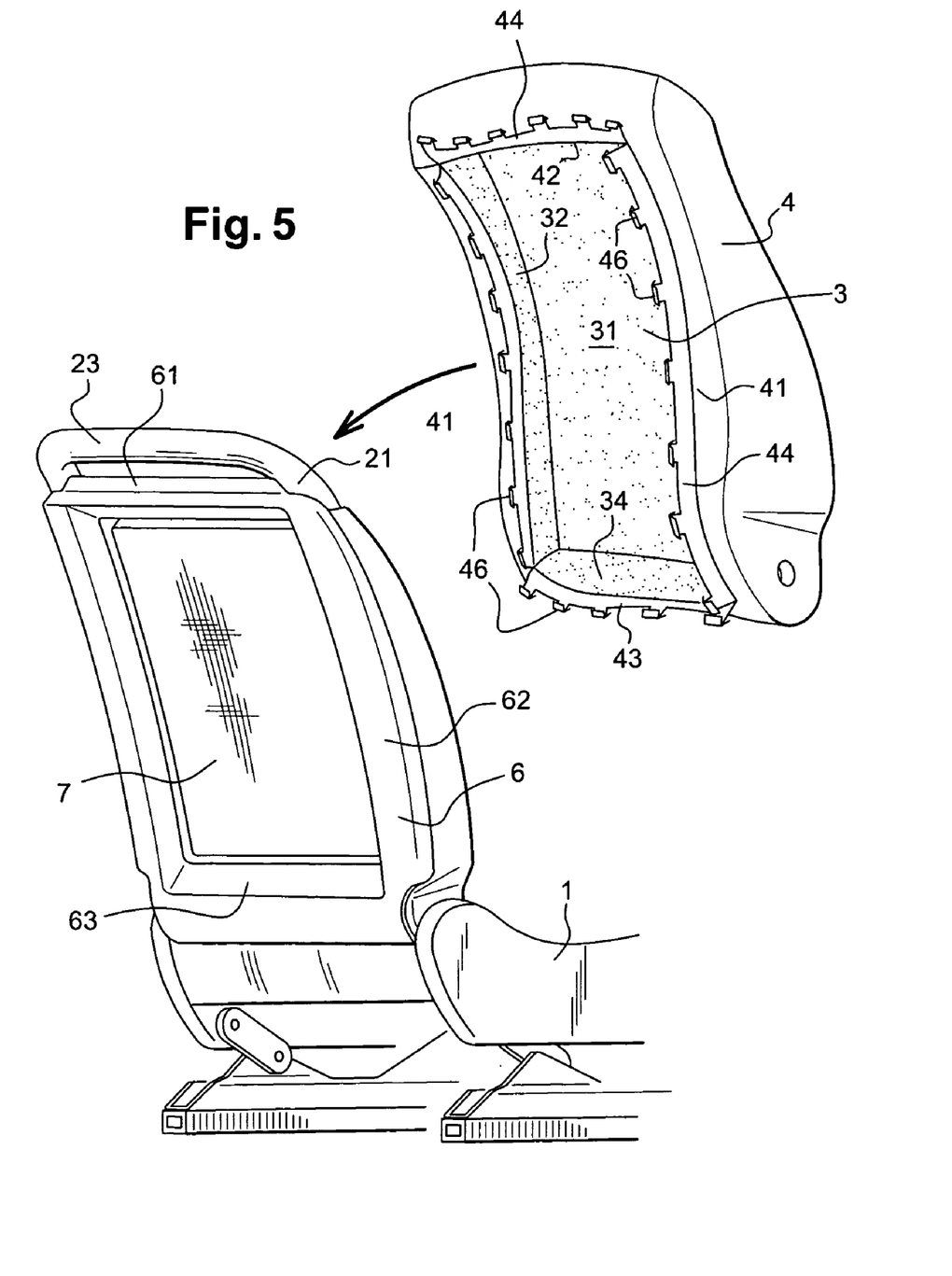
FIG. 5 shows the installation of the cover with the padding on the preequipped backrest of the shield frame.

Then, as shown on FIG. 5, the cover 4 and the padding 3 are placed on the backrest so that the peripheral padding sections 32, 33 and 34 of the padding cover the framework 21 and the flaps 41, 42, 43 of the cover 4 cover the rounded forms of the outer edges of the sides of shield frame 6. The edge 44 of the cover 4 is then inserted into the groove 64 of the shield frame until held by anchoring of the crenelations 46, the crenelations then being for this purpose pushed towards the bottom of the groove. For this purpose, a suitable flat tool could be used for example and slid between the edges of the cover and of the screen to push on the crenelations so that they penetrate into the holes 65 of the groove by pressing especially on the flange of the arrow forming the profile of the said crenelations. The padding of the backrest is then terminated and as shown on FIG. 1.

The padding could also be done by installing on the framework the shield frame unpadded with the screen then by installing the padding and the cover and by installing the screen only at end of installation. This method can especially allow access to be maintained to the inside of the backrest after installation of the padding and of the cover, for example to make various connections or installations of accessories requiring prior presence of the padding.

Figure 9:
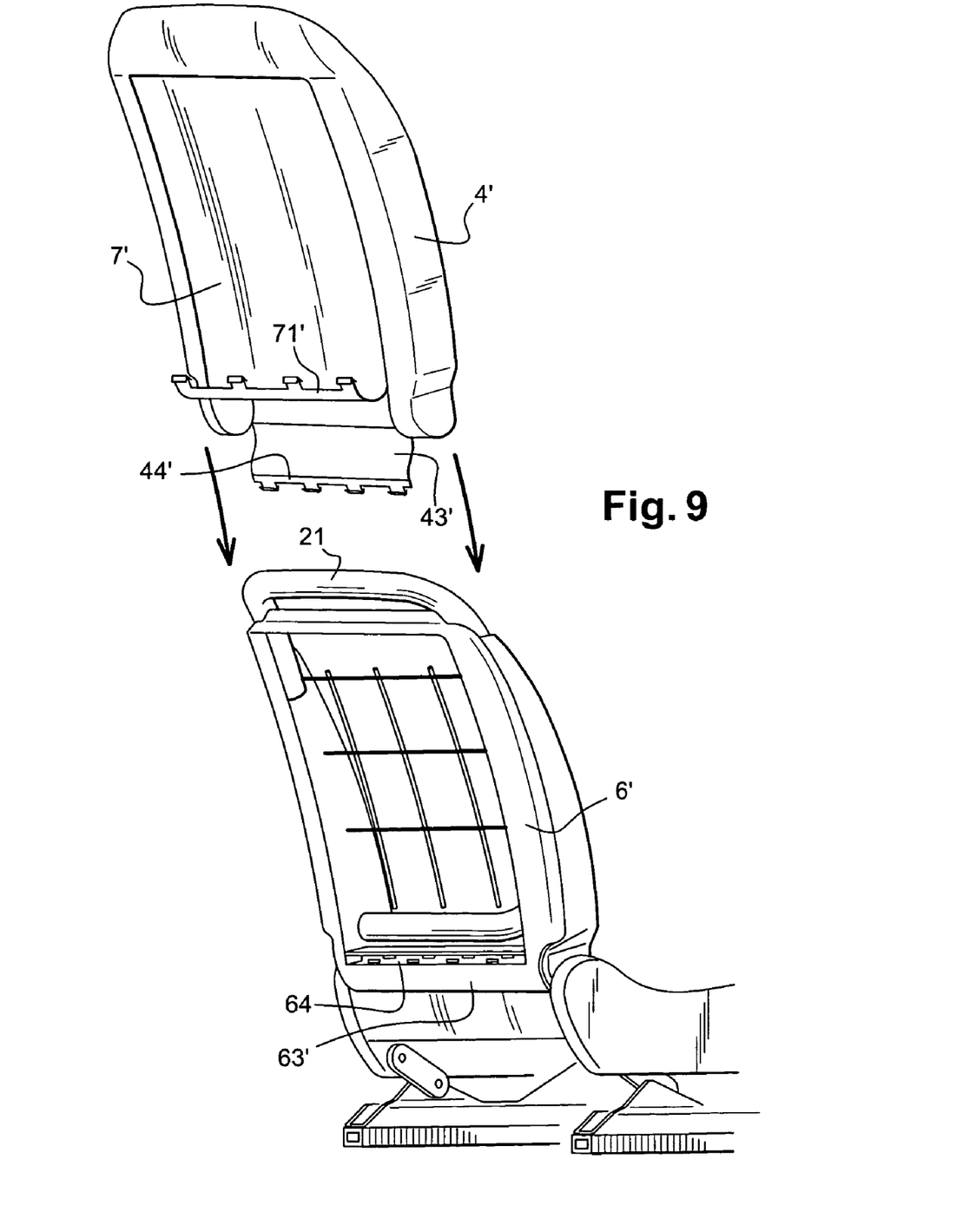
FIG. 9 is a view, during installation, of an embodiment variant, in which the screen is made in one piece with the cover.
Figure 10:
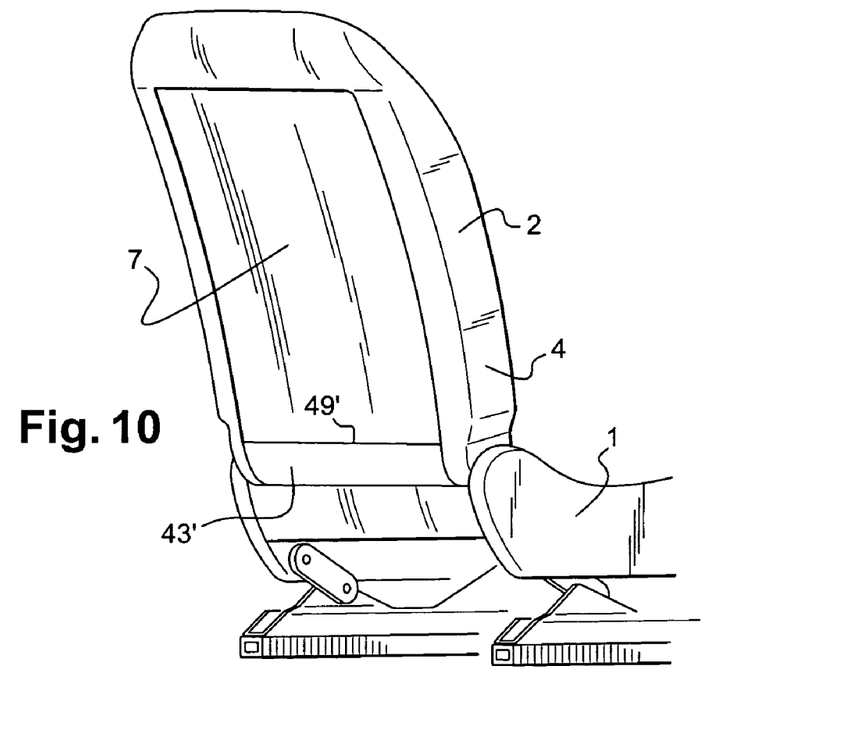
FIG. 10 is a view of the finished seat according to this variant.

FIGS. 9 and 10 show an embodiment variant in which the cover 4' is made in one piece with the backrest rear padding screen 7'. The shield frame 6' then includes a single attachment groove 64 located on the lower side 63' of the shield frame. By looking at the figure, it can be easily understood that the cover is then slid over the backrest by pulling it downwards, the edges 44' and 71' being, at the end of the operation, inserted into the groove 64, after the flap 43' has been passed under the bottom of the backrest and then raised behind it to finally form a finished backrest as shown on FIG. 10 with a single junction line 49' at the bottom of the rear face.

Figure 11:
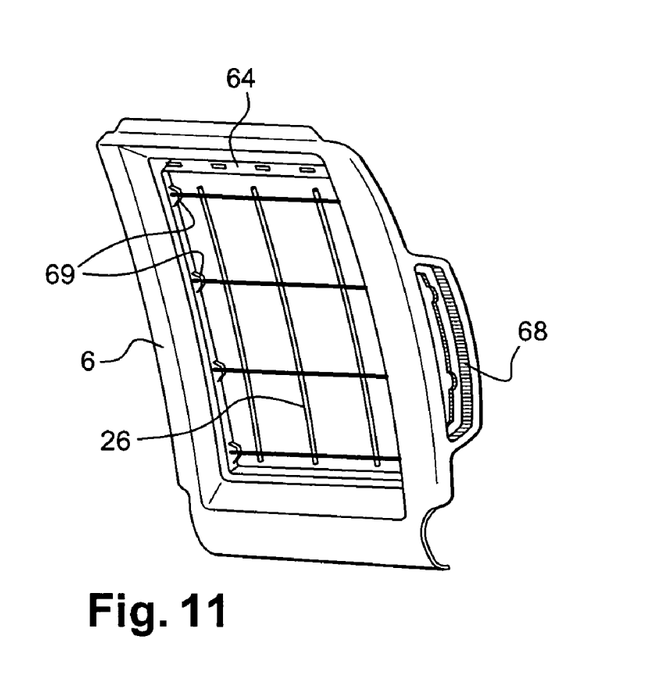
FIG. 11 shows, on the same view, two other variants, usable independently of each other. According to one, the attachment mat is attached to the shield frame; according to the other, the shield frame includes a counterform intended to integrate an inflatable safety cushion into the backrest.

FIG. 11 shows another embodiment possibility in which the shield frame 6 includes, on its bottom edge, more towards the inside of the groove 64, attachment tabs 69 and the suspension mat 26 of the backrest is attached directly to these tabs and no longer to the framework as in the first embodiment example.

FIG. 11 also shows another variant, in which the shield frame 6 includes on one of its sides a counterform 68 made from one piece by moulding with the shield frame allowing the integration of an inflatable safety cushion module into the backrest. In this case, a cutout is made in the cover, opposite the counterform, to pass the said module to integrate it into the thickness of the backrest, the edges of this cutout being laid over the said counterform to cover it when the cover is installed and the inflatable safety cushion module then being installed covering the edges of the said cutout.

The invention is not limited to the embodiments and variants described above only as examples. In particular, the opening of the shield frame groove may not be precisely oriented towards the rear of the backrest perpendicular to the general plane of the backrest as shown in the previous example, but could also be oriented obliquely or even parallel to this plane.

What is claimed is:

1. Backrest of an automobile vehicle seat including:
    a framework having a front side and a rear side,
    a padding,
    a padding cover covering the padding and a front face and sides of the backrest,
    a screen for a rear face of the backrest, and
    a rigid back panel shield frame,
    wherein the back panel shield frame is a frame with at least two lateral sides, a bottom side, and a central opening,
    the back panel shield frame is attached to the rear side of the framework of the backrest so as to cover lateral edges of the framework and a bottom part of the rear side of the framework of the backrest, the back panel shield frame includes towards an inner edge at least one groove adapted to accommodate and hold an edge of the padding cover and an edge of the screen, and the padding cover covers at least a portion of the back panel shield frame.

2. Backrest in accordance with claim 1, wherein the back panel shield frame is a closed frame that is formed by the two lateral sides, the bottom side, and a top side, the groove running continuously around these four sides, the screen is attached around its complete periphery in the groove, and the edge of the padding cover is also attached around its complete periphery in the groove.

3. Backrest in accordance with claim 2, wherein the edge of the padding cover includes flaps which extend beyond the padding and cover the sides and rear face of the back panel shield frame.

4. Backrest in accordance with claim 1, wherein the edges of the screen and/or the padding cover include elastic clips which can be inserted into corresponding holes made in the bottom of the groove.

5. Backrest in accordance with claim 4, wherein the clips are made from a profiled strip with an arrow-shaped section sewn onto the edge of the padding cover and/or of the screen.

6. Backrest in accordance with claim 1, wherein a suspension mat is attached to the back panel shield frame.

7. Backrest in accordance with claim 1, wherein the back panel shield frame includes, on at least one lateral side, a counterform for an inflatable protective cushion.

8. Backrest in accordance with claim 1, wherein the back panel shield frame is made of a recycled plastic material.

9. Backrest in accordance with claim 1, wherein the back panel shield frame includes:

two lateral sides to ensure the shape of the lateral edges of the rear of the backrest, and a bottom side to ensure the shape of the bottom of the backrest and to allow the attachment of the lower edge of the screen and of a lower flap extending from the front face of the padding cover and passing under the lower edge of the backrest.

10. Backrest in accordance with claim 1, wherein the padding cover covers all the external surfaces of the padding and includes a plurality of flaps that extend beyond the edges of the padding so as to cover the sides and rear face of the back panel shield frame.

11. Backrest in accordance with claim 1, further comprising:

a suspension mat attached to the framework;

wherein the screen is attached to the back panel shield frame so as to be located on behind and some distance from the suspension mat, and so as not to contact the framework.

12. Backrest in accordance with claim 1, wherein the framework is a closed frame including an upper crossmember, two lateral uprights, a lower crossmember, and a central opening.

13. Backrest in accordance with claim 12, wherein lower ends of the lateral uprights accommodate backrest-to-seat pan hinge mechanisms.

14. An automobile vehicle including at least one seat comprising the backrest in accordance with claim 1.

15. A seat comprising:

a backrest; and a seat pan hinged to the backrest, wherein the backrest includes:

a framework having a front side and a rear side, a padding, a padding cover covering the padding and a front face and sides of the backrest, a screen for a rear face of the backrest, and a rigid back panel shield frames, wherein the back panel shield frame is a frame with at least two lateral sides, a bottom side, and a central opening, the back panel shield frame is attached to the rear side of the framework of the backrest so as to cover lateral edges of the framework and a bottom part of the rear side of the framework of the backrest, the back panel shield frame includes towards an inner edge at least one groove adapted to accommodate and hold an edge of the padding cover and an edge of the screen, and the padding cover covers at least a portion of the back panel shield frame.

16. The seat in accordance with claim 15, wherein the back panel shield frame of the backrest is a closed frame that is formed by the two lateral sides, the bottom side, and a top side, the groove running continuously around these four sides, the screen of the backrest is attached around its complete periphery in the groove, and the edge of the padding cover of the backrest is also attached around its complete periphery in the groove.

17. The seat in accordance with claim 15, wherein the edges of the screen of the backrest and/or the padding cover of the backrest include elastic clips which can be inserted into corresponding holes made in the bottom of the groove.

18. The seat in accordance with claim 15, wherein the padding cover of the backrest covers all the external surfaces of the padding and includes a plurality of flaps that extend beyond the edges of the padding so as to cover the sides and rear face of the back panel shield frame.

19. The seat in accordance with claim 15, wherein the framework of the backrest is a closed frame including an upper crossmember, two lateral uprights, a lower crossmember, and a central opening.

20. An automobile vehicle including at least one seat in accordance with claim 15.

* * * * *